(12) United States Patent
Kato (10) Patent No.: US 8,152,581 B2
(45) Date of Patent: Apr. 10, 2012

(54) FLOATER FOR MARINE HOSE (75) Inventor: Noriyasu Kato, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 210 days.

(21) Appl. No.: 12/377,366

(22) PCT Filed: Aug. 31, 2007

(86) PCT No.: PCT/JP2007/066977
§ 371 (c)(1),
(2), (4) Date: Feb. 12, 2009

(87) PCT Pub. No.: WO2008/035559
PCT Pub. Date: Mar. 27, 2008

(65) Prior Publication Data
US 2010/0216360 A1 Aug. 26, 2010

(30) Foreign Application Priority Data

Sep. 19, 2006 (JP) ................................. 2006-253273

(51) Int. Cl.
*B63B 22/00* (2006.01)
*B63B 27/24* (2006.01)
*B63B 45/00* (2006.01)
*B63B 51/02* (2006.01)
*F16L 1/24* (2006.01)
*F16L 57/00* (2006.01)

(52) U.S. Cl. ................................ 441/133; 441/1; 441/13

(58) Field of Classification Search ............... 441/1, 133, 441/134, 136, 11, 13; 166/350; 405/171
See application file for complete search history.

(56) References Cited

U.S. PATENT DOCUMENTS

| | | | | |
|---|---|---|---|---|
| 3,332,093 | A | * | 7/1967 | Skinner et al. ................. 441/133 |
| 3,489,182 | A | * | 1/1970 | Cameron ........................ 138/103 |
| 3,597,779 | A | * | 8/1971 | Morgan ......................... 441/133 |

(Continued)

FOREIGN PATENT DOCUMENTS

DE 1 240 434 9/1962

(Continued)

OTHER PUBLICATIONS

European Search Report for Application No. 07806453.2, mailed Jul. 20, 2010.

*Primary Examiner* — Ajay Vasudeva
(74) *Attorney, Agent, or Firm* — Greer, Burns & Crain, Ltd.

(57) ABSTRACT

Provided is a floater for marine hose, which can be easily formed into an annular shape conformable even to marine hoses having variations in the circularity of their cross-section or to marine hoses of different outside diameters. A belt-like floater 1 is formed by rotatably connecting together, by using connection pins 7a, float blocks 2 equal to the number corresponding to the outside diameter of a marine hose 10. A fitting groove is formed on the inner side of the belt-like floater 1. The groove is placed along the outer surface of the marine hose 10 while being fitted onto a location collar 11 projected on the outer surface of the marine hose 10. Then, the end portions of the floater are coupled together by an end coupling member 7b. Thus, the floater 1 is fitted in annular shape onto the marine hose 10.

7 Claims, 6 Drawing Sheets

U.S. PATENT DOCUMENTS

| | | | |
|---|---|---|---|
| 3,705,432 A * | 12/1972 | Watkins, Jr. | 441/133 |
| 3,902,531 A | 9/1975 | Thawley | |
| 4,188,679 A * | 2/1980 | Hollaender et al. | 441/133 |
| 4,386,919 A | 6/1983 | Kadono | |
| 4,477,207 A * | 10/1984 | Johnson | 405/195.1 |
| 5,575,590 A | 11/1996 | Drost et al. | |
| 6,270,387 B1 * | 8/2001 | Nesheim | 441/133 |
| 7,100,641 B2 * | 9/2006 | Tyrer et al. | 138/110 |
| 7,214,114 B2 * | 5/2007 | Gibson | 441/133 |
| 7,744,314 B2 * | 6/2010 | Eide | 405/224.2 |
| 7,771,245 B2 * | 8/2010 | Routeau et al. | 441/133 |

FOREIGN PATENT DOCUMENTS

| | | |
|---|---|---|
| DE | 2 223 785 | 5/1972 |
| GB | 1 277 364 | 6/1972 |
| GB | 1 565 323 | 4/1980 |
| GB | 1565323 A * | 4/1980 |
| GB | 2 076 749 | 12/1981 |
| GB | 2 114 046 | 8/1983 |
| GB | 2114046 A * | 8/1983 |
| GB | 2 288 205 | 10/1995 |
| GB | 2288205 A * | 10/1995 |
| GB | 2 389 970 | 12/2003 |
| JP | Y1 40-12181 | 5/1965 |
| JP | 47-018613 | 6/1972 |
| JP | A 49-95217 | 9/1974 |
| JP | B1 51-31970 | 9/1976 |
| JP | A 53-89023 | 8/1978 |
| JP | Y2 62-17668 | 5/1987 |
| JP | 10084814 A * | 4/1998 |
| JP | A 2000-287590 | 10/2000 |
| JP | 2002369555 A * | 12/2002 |
| WO | WO 2004/023019 A1 | 3/2004 |

* cited by examiner

FLOATER FOR MARINE HOSE

This application is a U.S. National Phase under 35 U.S.C. §371 of International Application No. PCT/JP2007/066977, filed Aug. 31, 2007.

TECHNICAL FIELD

The present invention relates to a floater for marine hose, or more specifically, to a floater for marine hose which can be easily formed into an annular shape conformable even to marine hoses having variations in the circularity of cross sections or to marine hoses having different outside diameter sizes.

BACKGROUND ART

A marine hose is used to transport crude oil or the like by sea by connecting a tanker on the sea to a facility on the land. An annular-shaped floater designed to have predetermined buoyancy may be externally fitted onto a predetermined position on the marine hose in order to form an appropriate hose line among other purposes. Conventionally, this floater has a structure in which respective one ends of semiannular floating bodies are connected to each other by use of a hinge mechanism or the like, and in which respective other ends are connected to each other by use of an end coupling member to thereby form an annular shape (see Patent Document 1, for example).

Meanwhile, in manufacture of a marine hose, the marine hose is difficult to be formed into a circular shape in cross section, or even into a shape close to a perfect circle, at high accuracy. Even marine hoses of the same specification have variation in circularity. Moreover, a single marine hose has variation in the circularity depending on the position. Accordingly, having a predetermined shape when formed into an annular shape, the conventional bisected type floater may not be able to be fitted externally to the marine hose if the circularity of the marine hose falls below a certain level. There has therefore been a problem that a cumbersome operation such as alteration of the end coupling member is required to achieve fitting. Moreover, such a floater requires preparation of dedicated floaters depending on the outside diameter size of the marine hose in order to conform to the outside diameter of the marine hose. This causes a problem that huge costs are required for manufacturing and maintenance management.

Patent Document 1: Japanese patent application Kokai publication No. Sho 53-89023

DISCLOSURE OF THE INVENTION

Problems to be Solved by the Invention

An object of the present invention is to provide a floater for marine hose which can be easily formed into an annular shape conformable even to marine hoses having variations in the circularity of cross sections or to marine hoses having different outside diameter sizes.

Means for Solving the Problem

To attain the object, a floater for marine hose of the present invention is an annular-shaped floater for marine hose to be externally fitted onto a marine hose. The floater includes a plurality of float blocks connectable to and detachable from one another either directly or with a coupling member. In the floater, the plurality of float blocks are coupled to form the annular shape, and relative positions of adjacent float blocks of the annular shape are changeable.

Here, it is also possible to form all the float blocks in the same shape or to mix at least two types of float blocks each type having different values of buoyancy. Meanwhile, at least one of the float blocks may be provided with a fitting groove to be fitted onto a location collar provided in a protruding manner on an outer surface of the marine hose. Further, at least one of the float blocks may be provided with an additional device such as a lighting device or a sensor. Meanwhile, each of the float blocks may be given any of a color, a pattern, and a mark, determined according to the value of buoyancy of the float block, so that the value of the buoyancy of the float block can be identified by the external appearance thereof. It is also possible to form an outer edge in a cross section of the annual floater for marine hose in an axial direction of the marine hose into an arc shape that expands in a direction toward an outer side of the annular shape.

EFFECT OF THE INVENTION

According to the floater for marine hose of the present invention, the annular shape is formed by connecting the multiple float blocks rendered connectable to and detachable from one another either directly or through the coupling member, and the relative positions of adjacent float blocks of the annular shape are rendered changeable. Consequently, the annular shape to be formed can be deformed easily, and the size of the annular shape to be formed can be changed only by changing the number or the size of the float blocks to be connected. Thereby, the annular shape conformable to various types of marine hoses can easily formed without being influenced by the degree of circularity of the marine hoses or by the outside diameter sizes thereof. In this way, it is no longer necessary to prepare dedicated floaters depending on the outside diameter sizes of marine hoses, and it is therefore possible to drastically reduce costs for manufacturing and maintenance management.

BRIEF DESCRIPTION OF THE DRAWINGS

[FIG. 1]

[FIG. 2]

[FIG. 3]

[FIG. 4] FIGS. 4(a) to 4(c) are views exemplifying a float block constituting the floater in FIG. 1, in which

[FIG. 5]

[FIG. 6]

[FIG. 7]

[FIG. 8]

[FIG. 9]

[FIG. 10]

[FIG. 11]

EXPLANATION OF REFERENCE NUMERALS

1 FLOATER
2, 2a, 2b FLOAT BLOCKS
3 OUTER SHELL
4 FILLER
5 FITTING GROOVE
6 THROUGH HOLE
7a CONNECTION PIN
7b END COUPLING MEMBER
8 ANNULAR COUPLING MEMBER
9 SPACER
10 MARINE HOSE
11 LOCATION COLLAR
12 12a LIGHTING DEVICE
12b SENSOR
12c LINE SUPPORT
13 BUOY
M IDENTIFICATION MARK

BEST MODES FOR CARRYING OUT THE INVENTION

Now, a floater for marine hose of the present invention will be described below based on illustrated embodiments.

As exemplified in FIG. 1 to FIG. 3, a floater 1 for a marine hose of the present invention (hereinafter referred to as the floater 1) has float blocks 2 being connectable to and detachable from one another as basic modules, and is formed by connecting them. In this embodiment, nine float blocks 2 having the same shape and the same buoyancy are connected to form an annular shape, thereby constructing the floater 1 conformable to an outer shape of a marine hose 10 onto which the floater 1 is externally fitted.

Figure 4:
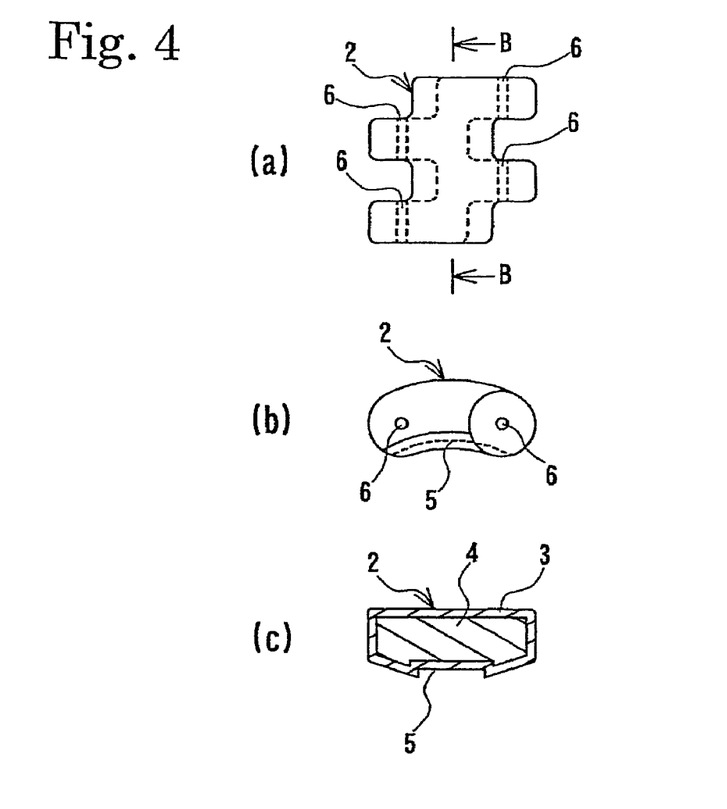
FIG. 4(a) is a plan view.
FIG. 4(b) is a side view.
FIG. 4(c) is a cross-sectional view taken along the B-B line in FIG. 4(a).

Each float block 2 includes two protrusions respectively on both ends in a connecting direction with a space therebetween in a width direction as exemplified in FIG. 4(a), and each of the protrusions is provided with a through hole 6. These protrusions are disposed at both ends so as to be offset from each other. As shown in FIG. 4(b), this float block 2 is formed into an arc shape when viewed sideways, and a fitting groove 5 is formed on an inner surface of the arc shape.

As shown in FIG. 4(c), the float block 2 has a structure in which a filler 4 such as hard urethane foam is filled into a hollow outer shell 3 made of polyethylene resin, for example. The materials of the outer shell 3 and the filler 4 are not limited to those exemplified above, and various materials are applicable. Moreover, the structure of the float block 2 may also take other structures such as a structure in which multiple types of fillers 4 is filled, or a structure in which the outer shell 3 is formed as a solid body without providing the filler 4 therein. Meanwhile, a corner on an inner side of a lateral cross section of the float block 2 is formed into a tapered shape so as not to hinder bending of the marine hose 10.

As exemplified in FIG. 1, these float blocks 2 are rotatably connected to one another in the following manner. Specifically, a protrusion of one float block 2 is engaged into a space between protrusions of an adjacent float block 2. Then, a connection pin 7a is inserted into the through holes 6 provided in the protrusions. As exemplified in FIGS. 2 and 3, the belt-like floater 1 having the float blocks 2 thus connected allows the fitting groove 5 on the inner side to be fitted onto a ring-shaped location collar 11 continuously provided in a protruding manner in a circumferential direction on an outer surface of the marine hose, and is formed into the annular shape along the outer surface of the marine hose 10. Ends of the floater 1 are coupled to each other by use of an end coupling member 7b.

This end coupling member 7b includes a fitting having an end to be inserted to the through holes 6 of the end float block 2 and having another end provided with a screw groove, and a connecting fitting having an end to be inserted to the through holes 6 of the other end float block 2 and having another end to be engaged with the screw groove. Here, the end coupling member 7b only needs to be able to couple the ends of the floater 1 firmly together and the structure thereof is not particularly limited.

In this floater 1, the float blocks 2 rotate pivotally around the connection pin 7a so that respective positions between the adjacent float blocks 2 in the annular shape can be easily changed. Therefore, it is possible to easily deform the annular shape (an inside diameter shape) to be formed. For this reason, even when the marine hose 10 has a low circularity because of having variations in the circularity among the marine hoses of the same specification, or because of having variations in the circularity depending on positions in a single marine hose, it is possible to easily form the annular shape conformable to the outer sectional shape of the marine hose 10 and thereby to externally fit the floater 1 to the marine hose 10 efficiently without carrying out a cumbersome operation.

Moreover, it is possible to change the size of the annular shape of the floater 1 to be formed merely by increasing or decreasing the number of the float blocks 2 to be connected to one another through attaching or detaching the connection pins 7a, or by changing the size of the float blocks 2. Accordingly, it is not necessary to prepare dedicated floaters 1 depending on the outside diameter size of the marine hose 10, and it is thereby possible to drastically reduce costs for manufacturing and maintenance management.

As described above, the floater 1 has high versatility, which allows the floater 1 to conform to many types of marine hoses 10 without being influenced by the degree of circularity or the outside diameter size of the marine hoses 10. Moreover, the transportation or storage of the float blocks 2 can be performed with improved efficiency by disassembling the connected float blocks 2 and thus greatly reducing the occupied space.

Furthermore, the main body of this floater 1 is formed of the float blocks 2 all of which have the same shape and the same buoyancy. Therefore, since just one type of float blocks 2 need to be prepared, it is possible to significantly reduce cost burdens. In order to deal with more marine hoses 10 in various sizes and to correspond to buoyancy requirements more precisely, it is preferable to prepare several types of float blocks 2 that constitute basic modules for typical specifications (in terms of the shape, the size, the buoyancy, and the like) so that various floaters 1 can be formed by combining these float blocks 2.

An attachment operation of the floater 1 to the marine hose 10 takes place in advance either on the land or on the ship. However, if, for example, the buoyancy of the marine hose 10 already disposed on the sea or in the sea becomes insufficient, it is easily possible to adjust the buoyancy on site by replacement with the float blocks 2 having different buoyancy.

The number of the float blocks 2 to be connected is not limited to nine pieces as shown in the above-described embodiment. The number of float blocks 2 may be any, provided that the number is three and over and enough to form the floater 1 in the annular shape so as to follow the location collar 11 provided on the outer surface of the marine hose 10. Accordingly, the number of float blocks 2 is determined appropriately depending on factors such as the outside diameter size of the location collar 11. For example, when the location collar 11 has the outside diameter approximately in a range from 500 mm to 800 mm, the floater 1 is formed by connecting about five to eight float blocks 2 annularly while setting the buoyancy of each float block 2 approximately in a range from 0 to 30 kg.

The buoyancy of the float block 2 may be set equal to 0 kg when it is not desirable to provide the marine hose 10 with extra buoyancy. This is, for example, a case where a device (an additional function unit) is to be added to the marine hose 10 of a submarine type, and a hose line, the shape of which has already been determined, should not be deformed because of the addition of the device. In such a case, the buoyancy is set equal to 0 kg in consideration of the weight of the added device.

Also, the shape of the float blocks 2 is not limited only to the shape exemplified in the above-described embodiment, and various shapes are applicable. Meanwhile, the floater 1 can be formed by mixing the float blocks 2 having different shapes, provided that the relative positions of the adjacent float blocks 2 can be changed after the float blocks 2 having different shapes are formed annularly.

It is preferable to provide all the float blocks 2 with the fitting groove 5 so that the floater 1 can be stably fitted onto the marine hose 10. However, when sufficient fixation strength can be ensured, the fitting groove 5 may also be formed in the float blocks 2 forming the annular shape at an appropriate interval such as one in every two or three float blocks 2, or alternatively, may be formed in only one float block 2 at the minimum.

Figure 5:
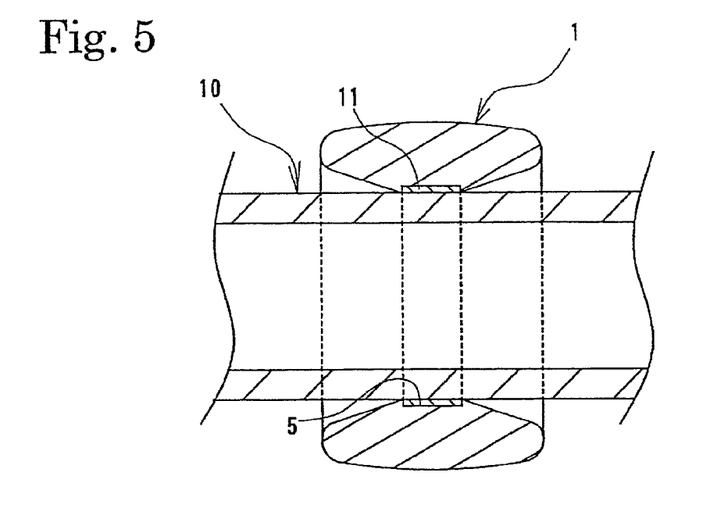
FIG. 5 is a cross-sectional view of a floater taken in an axial direction of the marine hose, showing a modified example of FIG. 3.

As exemplified in FIG. 5, an outer edge of the annular floater 1 in a cross section in the axial direction of the marine hose is preferably formed into a gentle arc shape so as to expand in a direction toward the outer side of the annular floater 1. In this way, resistance of water received from waves, tides, and the like is reduced. Accordingly, it is possible to reduce drift of the marine hose 10 and to suppress displacement of the hose line.

Figure 6:
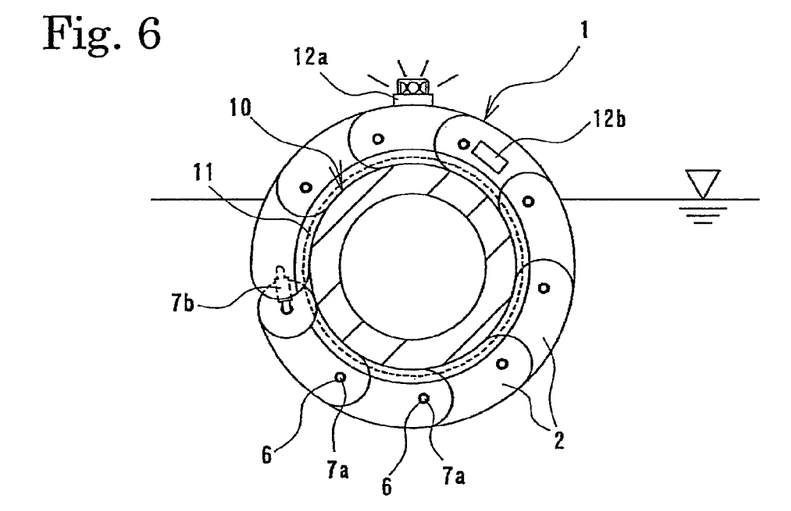
FIG. 6 is a side view of a floater, showing a modified example of FIG. 2.
Figure 7:
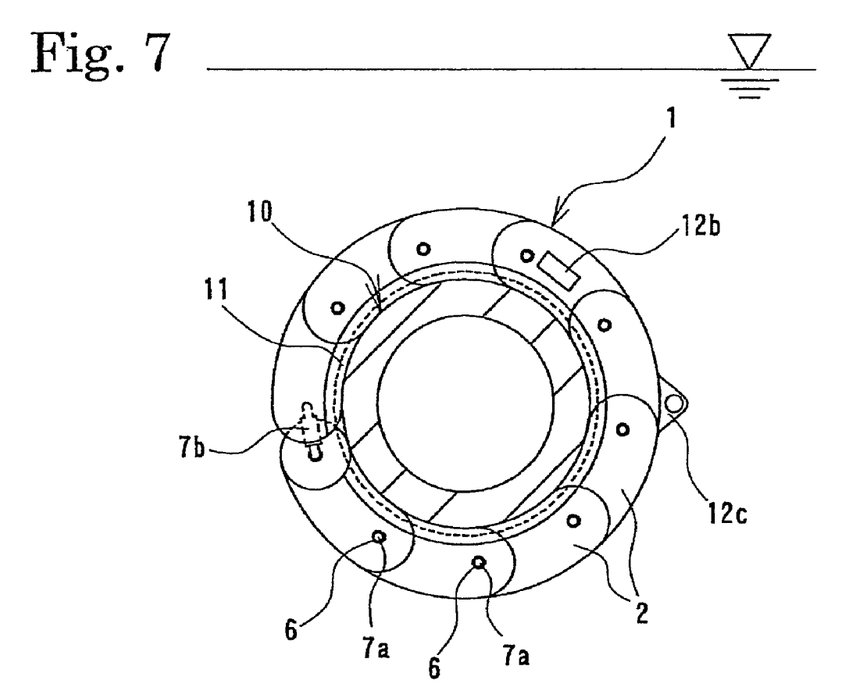
FIG. 7 is a side view of a floater, showing another modified example of FIG. 2.

Meanwhile, as shown in a floating hose exemplified in FIG. 6 or in a submarine hose exemplified in FIG. 7, the float block 2 may be provided with additional function units having functions that are different from a buoyant function, including, a lighting device 12a, various sensors (including a transmitter) 12b for detecting the position, the pressure and the like, and a line support 12c for retaining parallel lines. One float block 2 may be provided with one of or more than one of these additional function units. By preparing the float blocks 2 provided with these additional function units in advance, it is possible to load additional functions on the marine hose 10 easily and at low costs.

Figure 8:
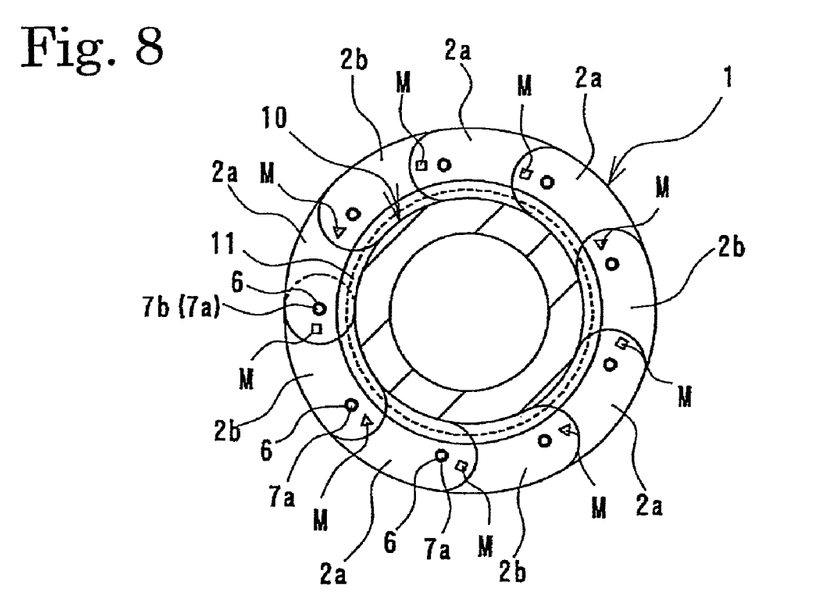
FIG. 8 is a side view exemplifying a floater according to another embodiment.

FIG. 8 shows another embodiment. A basic structure of this floater 1 is the same as the floater 1 shown in FIGS. 1 to 3. Accordingly, only the difference will be described below.

In this floater 1, one end float block 2 is connected to the other end float block 2 by engaging the protrusion of the one end float block 2 into the concave portion between the protrusions of the other end float block 2 and then by inserting the connection pin 7a into the through holes 6 provided on the protrusions. In this way, the connection pin 7a can be used also as the end coupling member 7b instead of using the special end coupling member 7b.

Further, this floater 1 is formed by connecting two types of float blocks 2a and 2b having the same shape but different values of buoyancy. In this way, by preparing two or more types of float blocks 2a and 2b having different values of buoyancy, the buoyancy of the floater 1 can be adjusted easily by combining them.

Figure 11:
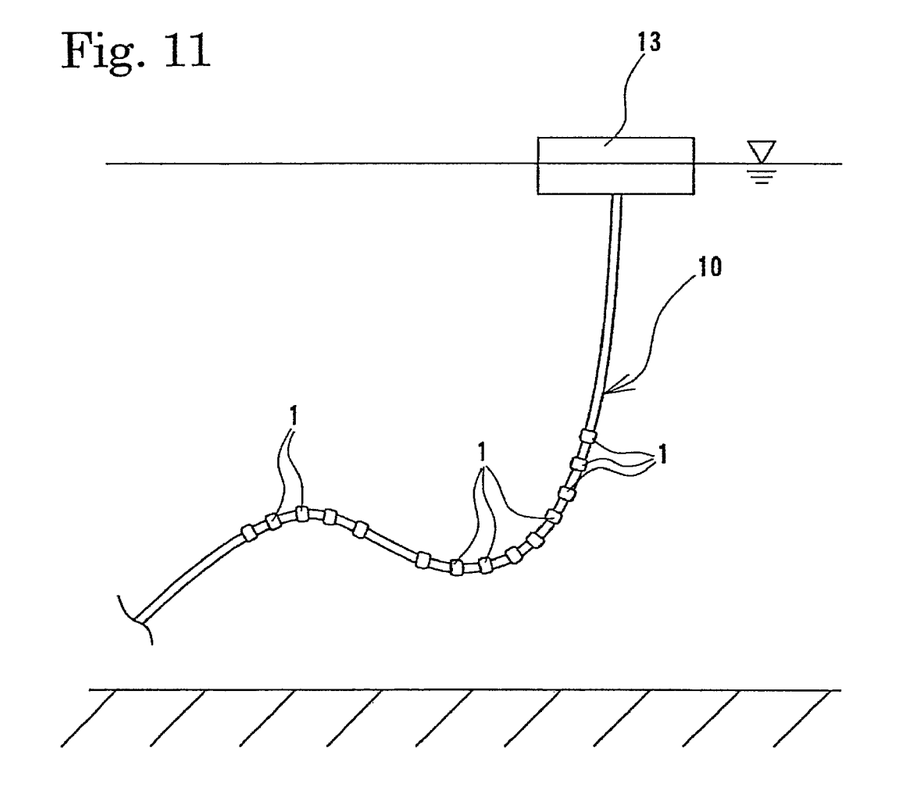
FIG. 11 is an explanatory view showing a usage example of a floater.

In this way, it is possible to promptly form the floater 1 having the necessary buoyancy calculated by a numerical analysis or the like in order to form a predetermined hose line. As exemplified in FIG. 11, it is possible to form a desired hose line by externally fitting the floaters 1 having predetermined buoyancy values to predetermined positions on the marine hose (the submarine hose) 10 extending from a buoy 13 on the sea surface to the bottom of the sea.

Signs such as colors, patterns or engraved marks may be determined according to the values of the buoyancy of the float blocks 2a and 2b, so that the values of the float blocks 2 may be given identification marks M formed of the colors, the patterns, the engraved marks or combinations thereof depending on the values of the buoyancy. In the embodiment shown in FIG. 8, the float blocks 2a and 2b having different values of buoyancy are provided with square and triangular engraved marks, respectively, as the identification marks M. In this way, by rendering the buoyancy of each of the float blocks 2a and 2b identifiable by external appearance, the entire buoyancy of the floater 1 can be grasped at a glance even when the floater 1 is formed by mixing the float blocks 2a and 2b having different values of buoyancy.

Figure 9:
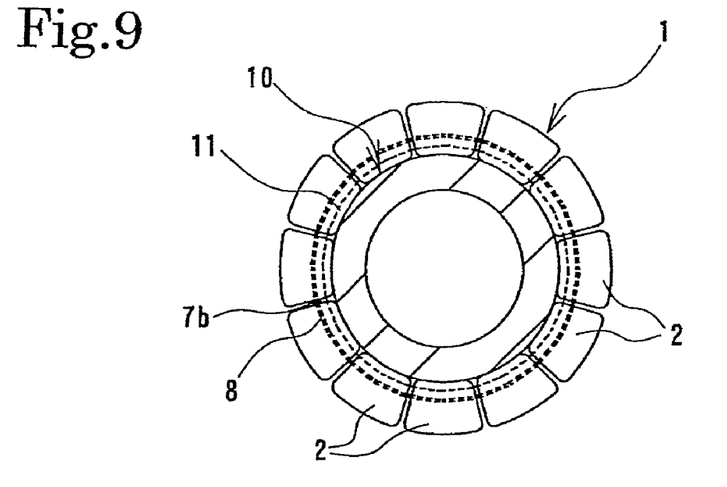
FIG. 9 is a side view exemplifying a floater according to still another embodiment.

FIG. 9 shows still another embodiment. The technical concept of this floater 1 is the same as that of the floater 1 shown in FIGS. 1 to 3. Accordingly, only the difference will be described below. The float blocks 2 constituting this floater 1 are connected together by penetration of a belt-like annular coupling member 8. The end coupling members 7b are provided on both sides of the annular coupling member 8 constituting ends, and the annular floater 1 is formed by coupling these end coupling members 7b together. These float blocks 2 can be disassembled just by pulling the annular coupling member 8 penetrating therethrough.

In this way, the floater 1 may also be formed annularly by connecting the float blocks 2 through the interposition of the annular coupling member or the like instead of connecting the adjacent float blocks 2 directly. In this floater 1, the annular coupling member 8 is freely deformable between the float blocks 2 and 2. Accordingly, it is possible to achieve the configuration in which the relative positions of the adjacent float blocks 2 and 2 in the annular shape can be changed. It is therefore possible to form the annular shape conformable to the outer sectional shape of the marine hose 10.

Figure 1:
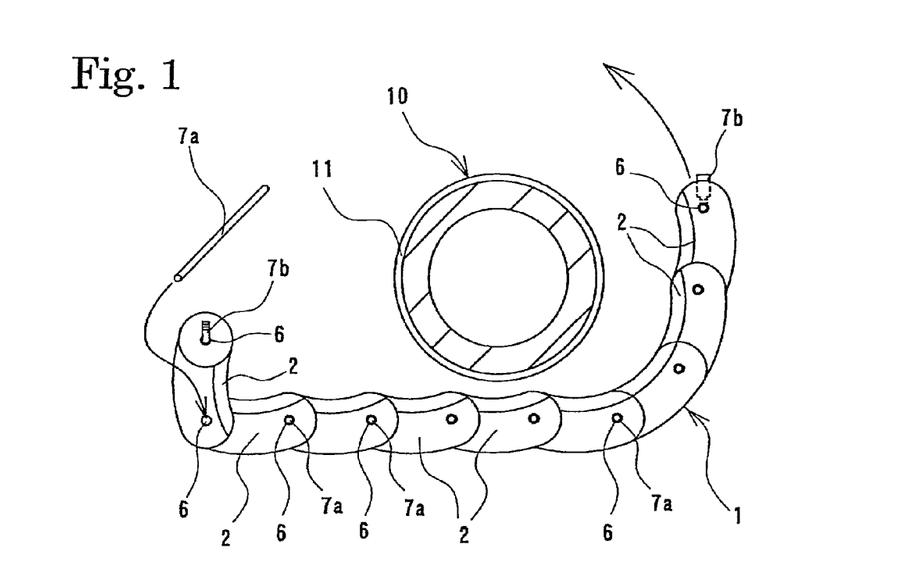
FIG. 1 is a side view exemplifying an expanded state of a floater of the present invention.
Figure 2:
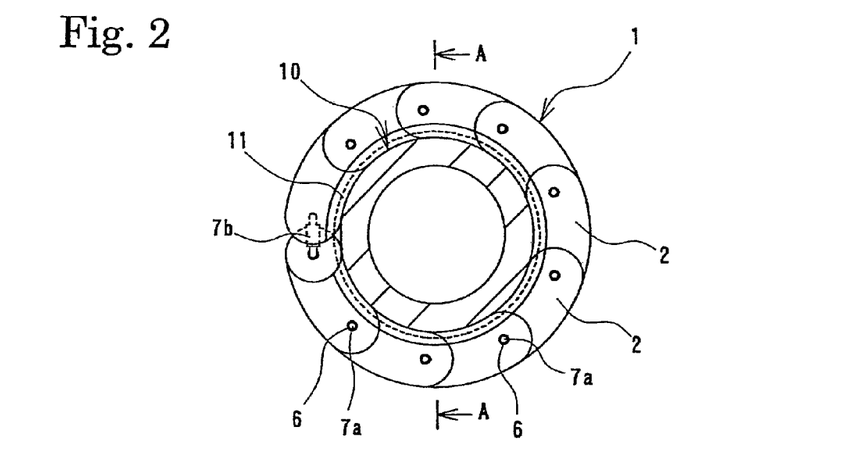
FIG. 2 is a side view exemplifying a state of the floater in FIG. 1 being formed into an annular shape.
Figure 3:
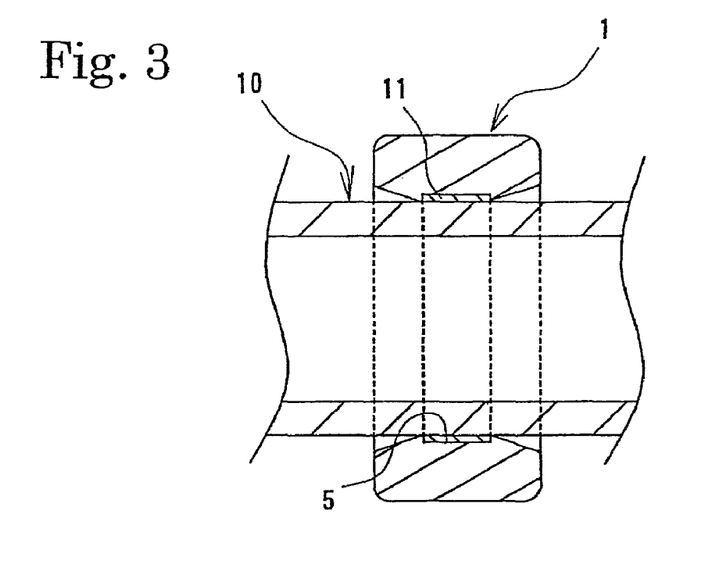
FIG. 3 is a cross-sectional view taken along the A-A line in FIG. 2.

This floater 1 also has similar effects to those of the floater 1 exemplified in FIGS. 1 to 3, namely, high versatility, which allows the floater 1 to be fitted onto the marine hose 10 without being influenced by the degree of circularity or the outside diameter size of the marine hoses 10, and high efficiency at the time of transportation or storage as well. Moreover, the structure is simpler than the floater 1 using the connection pins 7a and no rotating and sliding portions are provided therein. Therefore, the floater 1 of this embodiment has an advantage of improved durability.

Usable as the annular coupling member 8 is, for example, a belt-like body made of metal such as stainless steel or a belt-like body made of resin such as polyamide-type resin. Meanwhile, instead of the single annular coupling member 8 having a length equal to or greater than the outer peripheral length of the marine hose 10 as exemplified in the above-described embodiment, it is also possible to provide the annular coupling member 8 configured to couple two or several adjacent float blocks 2 to one another.

Figure 10:
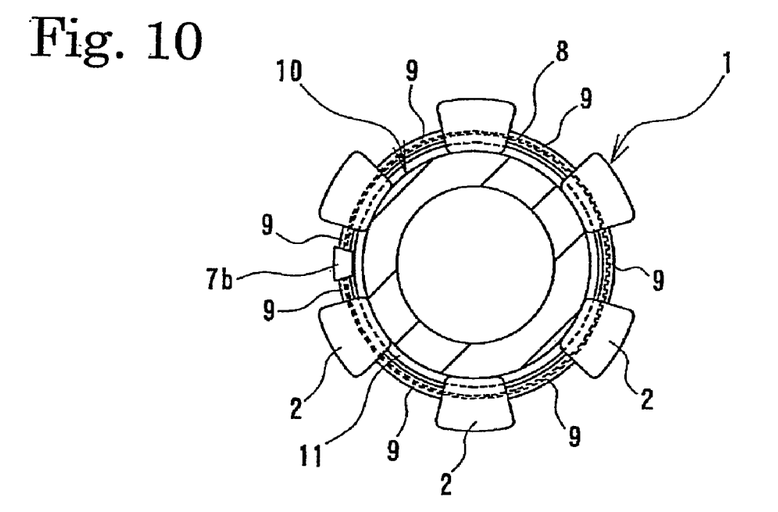
FIG. 10 is a side view exemplifying a modified example of the floater in FIG. 9.

As exemplified in FIG. 10, it is also possible to interpose spacers 9 between adjacent float blocks 2 and 2. This spacer 9 is disposed between the float blocks 2 and 2 by allowing the annular coupling member 8 to penetrate therethrough. This spacer 9 only needs to cause the adjacent float blocks 2 to be located with a predetermined space therebetween, and specifications thereof are not particularly limited. The fitting structure between the spacer 9 and the annular coupling member 8 may take various other structures, as well.

According to this configuration, the space between the float blocks 2 and 2 can easily be adjusted by changing the presence of the spacers 9 or the size of the spacers 9. The buoyancy can be adjusted easily, as well.

What is claimed is:

1. A floater for marine hose having an annular shape to be externally fitted onto a marine hose,
   the floater comprising at least three float blocks connectable to and detachable from one another either directly or with a coupling member, all of the float block having the same shape,
   wherein each float block includes a plurality of protrusions respectively on both ends in a connecting direction with a space there between in a width direction,
   the protrusions on both ends of each float block are capable of being coupled with protrusions on adjacent float blocks such that at least one protrusion at each end of each float block is disposed in the space between the protrusions of the adjacent float block to form the annular shape, and
   relative positions of adjacent float blocks of the annular shape are changeable.

2. The floater for marine hose according to claim 1,
   wherein at least two types of float blocks having different predetermined values of buoyancy are mixed in the float blocks.

3. The floater for marine hose according to claim 1,
   wherein at least one of the float blocks is provided with a fitting groove to be fitted onto a location collar provided in a protruding manner on an outer surface of the marine hose.

4. The floater for marine hose according to claim 1,
   wherein at least one of the float blocks is provided with an additional function unit.

5. The floater for marine hose according to claim 1,
   wherein each of the float blocks is given any of a color, a pattern, and a mark, determined according to the value of buoyancy of the float block, so that the value of the buoyancy of the float block can be identified by the external appearance thereof.

6. The floater for marine hose according to claim 1,
   wherein an outer edge of the annual floater for marine hose in a cross section in an axial direction of the marine hose is formed into an arc shape so as to expand in a direction toward an outer side of the annular shape.

7. The floater for marine hose according to claim 1,
   wherein at least two types of float blocks are designed to have different predetermined values of buoyancy are mixed in the float blocks.

\* \* \* \* \*